(12) United States Patent
Visser

(10) Patent No.: US 8,398,480 B2
(45) Date of Patent: Mar. 19, 2013

(54) GAMING SYSTEM AND METHOD OF GAMING

(75) Inventor: Antoon Christiaan Visser, Coogee (AU)

(73) Assignee: Aristocrat Technologies Australia Pty Limited, North Ryde, NSW (AU)

( * ) Notice: Subject to any disclaimer, the term of this patent is extended or adjusted under 35 U.S.C. 154(b) by 829 days.

(21) Appl. No.: 12/395,158

(22) Filed: Feb. 27, 2009

(65) Prior Publication Data

US 2009/0227365 A1 Sep. 10, 2009

(30) Foreign Application Priority Data

Feb. 28, 2008 (AU) .............................. 2008900982

(51) Int. Cl.
*A63F 9/24* (2006.01)
*A63F 13/00* (2006.01)
*G06F 17/00* (2006.01)
*G06F 19/00* (2011.01)

(52) U.S. Cl. ........................................ 463/21; 463/26

(58) Field of Classification Search .................. 463/16, 463/20, 21, 22, 17, 18, 19, 25, 26, 27, FOR. 000
See application file for complete search history.

(56) References Cited

U.S. PATENT DOCUMENTS

| 5,769,716 A * | 6/1998 | Saffari et al. ................... 463/20 |
| 6,142,875 A | 11/2000 | Kodachi et al. |
| 2006/0003829 A1 * | 1/2006 | Thomas .......................... 463/20 |
| 2006/0030399 A1 * | 2/2006 | Baerlocher ..................... 463/20 |
| 2007/0225060 A1 | 9/2007 | Yoshimura |
| 2007/0254734 A1 | 11/2007 | Gilmore et al. |
| 2008/0132321 A1 * | 6/2008 | Pau ................................. 463/20 |
| 2008/0139288 A1 * | 6/2008 | Jackson .......................... 463/20 |

FOREIGN PATENT DOCUMENTS

| EP | 1473681 | 11/2004 |
| JP | 2005028188 | 2/2005 |

* cited by examiner

*Primary Examiner* — Olik Chaudhuri
*Assistant Examiner* — Quovaunda V Jefferson
(74) *Attorney, Agent, or Firm* — Hanley, Flight & Zimmerman, LLC

(57) ABSTRACT

A gaming system is provided including a game controller arranged to control play of a game, and a display arranged to display a representation of play of the game. The game controller is arranged to select a plurality of symbols from a set of symbols for play of the game, and to control the display to display a plurality of the selected symbols. The game controller is arranged to control the appearance of at least one of the symbols of the set of symbols so that the appearance of the at least one of the symbols is indicative of a probability of winning a prize based on the at least one of the symbols.

29 Claims, 9 Drawing Sheets

GAMING SYSTEM AND METHOD OF GAMING

CROSS-REFERENCE TO RELATED APPLICATIONS

The present application claims the benefit of priority to Australian Provisional Patent Application No. 2008900982, filed on Feb. 28, 2008, entitled "A GAMING SYSTEM AND A METHOD OF GAMING", which is herein incorporated by reference in its entirety.

FIELD OF THE INVENTION

The present invention relates to a gaming system and to a method of gaming.

BACKGROUND OF THE INVENTION

It is known to provide a gaming system which comprises a game controller arranged to randomly select and cause the display of several symbols from a predetermined set of symbols and to determine a game outcome, such as a game win, based on the displayed symbols. Such gaming systems may commonly be implemented as a stepper machine provided with reels with each reel carrying several symbols of the set, or a video machine wherein selected symbols are displayed on virtual reels on a graphical display device. Win outcomes can occur based on symbols appearing in one or more horizontal lines, diagonal lines, or any other predetermined way. Typically five reels across are provided on the display (although less or more may be provided). Each reel or virtual reel display is three symbols high in the display window for the reel (although, again, this may be more or less symbols high).

In many countries, the regulations prescribe that the number of available symbols to select from be a fixed number. With stepper reels this is implemented by having a fixed number of symbols on each reel. With video implementation or other "virtual" reel implementations this is implemented in a similar manner, by allowing only a predetermined number of symbols for each virtual reel. A problem with requiring a fixed number of reel "stops", whether virtual or stepper, is that this limits the number of combinations that a typical reel game can provide for entertainment of the player.

In many gaming systems, a player can choose whether or not to wager on one or more win lines for each play of the game. The value of the wager for each win line may be determined by the player. A prize awarded to the player for a winning combination on a win line will generally be in proportion to the amount of credits bet for that win line by the player. This is perceived to be fair, as the more credits that the player is willing to risk, the higher the potential return.

While it is a simple matter to scale the amount of prize return with regard to the amount of credit bet by the player for prizes that are of known value for a winning combination, it is not possible to do this for jackpot prizes, which accumulate over a period of time. Jackpot prizes may, for example, depend on a percentage amount of credits entered into a gaming machine over a period of time, or even a percentage amount of credits entered into linked gaming machines (linked jackpots) over a period of time. Winning of the jackpot is generally independent of the amount of credit wagered on any particular win line by a player. This is perceived as being unfair to players who are willing to wager large amounts of credit in order to win a jackpot.

SUMMARY OF THE INVENTION

Certain embodiments of the present invention provide a gaming system, including a game controller arranged to control play of a game, and a display arranged to display a representation of play of the game, the game controller being arranged to select a plurality of symbols from a set of symbols for play of the game, and to control the display to display a plurality of the selected symbols, the game controller being arranged to control the appearance of at least one of the symbols of the set of symbols so that the appearance of the at least one of the symbols is indicative of a probability of winning a prize based on the at least one of the symbols.

In an embodiment, the game controller is arranged to vary the probability of winning a prize based on the at least one of the symbols.

In an embodiment, the game controller is also arranged to vary the probability of the at least one of the symbols being selected. In an embodiment, the variation of probability of the symbol being selected is controlled in accordance with the probability of winning a prize, indicated by the appearance of the at least one of the symbols. In an embodiment, the selection of the at least one of the symbols is varied by increasing the number of the at least one of the symbols available for selection from the set of symbols. In an alternative embodiment, the probability is varied by weighting the selection of the at least one of the symbols from the set of symbols, so that there are more chances of the at least one of the symbols being selected.

In an embodiment, the probability of winning the prize based on the symbol is varied in dependence upon the credit bet by a player. In an embodiment, the at least one of the symbols may represent a jackpot symbol, and the probability of the at least one symbol being selected is varied in accordance with the amount of credit bet, in order to vary the probability of winning the prize. In one embodiment, the probability of the jackpot symbol being selected is varied in proportion to the amount of credit bet. This embodiment has the advantage that the chances of winning a jackpot are varied in proportion to the amount of credit bet, which is perceived as being fairer than the prior art situation where the probability of winning the jackpot is independent of credit bet.

In an embodiment, the game controller is arranged to control the appearance of the at least one of the symbols so that the size of the symbol changes. In an embodiment, if there is an increased probability of winning the prize based on the symbol, the size of the symbol is increased.

In an embodiment, the game controller is arranged to control the appearance of the at least one of the symbols so that a number of items in the symbol varies to indicate variation in probability of winning the prize. In an embodiment, an increased number of items in the symbol represents an increased probability of winning the prize based on the symbol.

In an embodiment, the game controller is arranged to determine a game outcome based on the symbol selection. At least this embodiment has the advantage that a clear indication is provided to the player of the probability of them achieving a winning prize outcome based on a prize depending on the symbol, by the appearance of the symbol. It has the advantage of providing a graphically interesting method to indicate prize winning probabilities to a player.

In an embodiment, the game controller is arranged to control the display to display a plurality of the selected symbols in one or both of rows and columns. In an embodiment, the one or both of rows and columns of symbol positions is represented as a reel bearing the symbols, or is a reel bearing the symbols.

In accordance with as second aspect, the present invention provides a method of gaming, including the steps of selecting a plurality of symbols from a set of symbols for play of a game, controlling a display to display at least a plurality of the selected symbols, and controlling the appearance of at least one of the symbols of the set of symbols so that the appearance of the at least one of the symbols is indicative of the probability of winning a prize based on the at least one of the symbols.

In accordance with a third aspect, the present invention provides a computer program including instructions for controlling a computer to implement a gaming system in accordance with the first aspect of the invention.

In accordance with a fourth aspect, the present invention provides a computer readable medium providing a computer program in accordance with the third aspect of the invention.

In accordance with a fifth aspect, the present invention provides a data signal including the computer program of the third aspect of the invention.

In accordance with a sixth aspect, the present invention provides a game controller for a gaming system, the game controller being arranged to control play of a game, and to control a display to display a representation of play of the game, the game controller being arranged to select a plurality of symbols from a set of symbols for play of the game, and to control the display to display a plurality of the selected symbols, the game controller being arranged to control the appearance of at least one of the symbols of the set of symbols so that the appearance of the at least one of the symbols is indicative of the probability of winning a prize based on the at least one of the symbols.

In accordance with a seventh aspect, the present invention provides a computer program, including instructions for controlling a computer to implement a game controller in accordance with the sixth aspect of the invention.

In accordance with an eighth aspect, the present invention provides a computer readable medium, providing a computer program in accordance with the seventh aspect of the invention.

In accordance with a ninth aspect, the present invention provides a data signal, including a computer program in accordance with the seventh aspect of the invention.

BRIEF DESCRIPTION OF THE FIGURES

Features and advantages of the present invention will become apparent from the following description of embodiments thereof, by way of example only, with reference to the accompanying drawings, in which.

Figure 1:
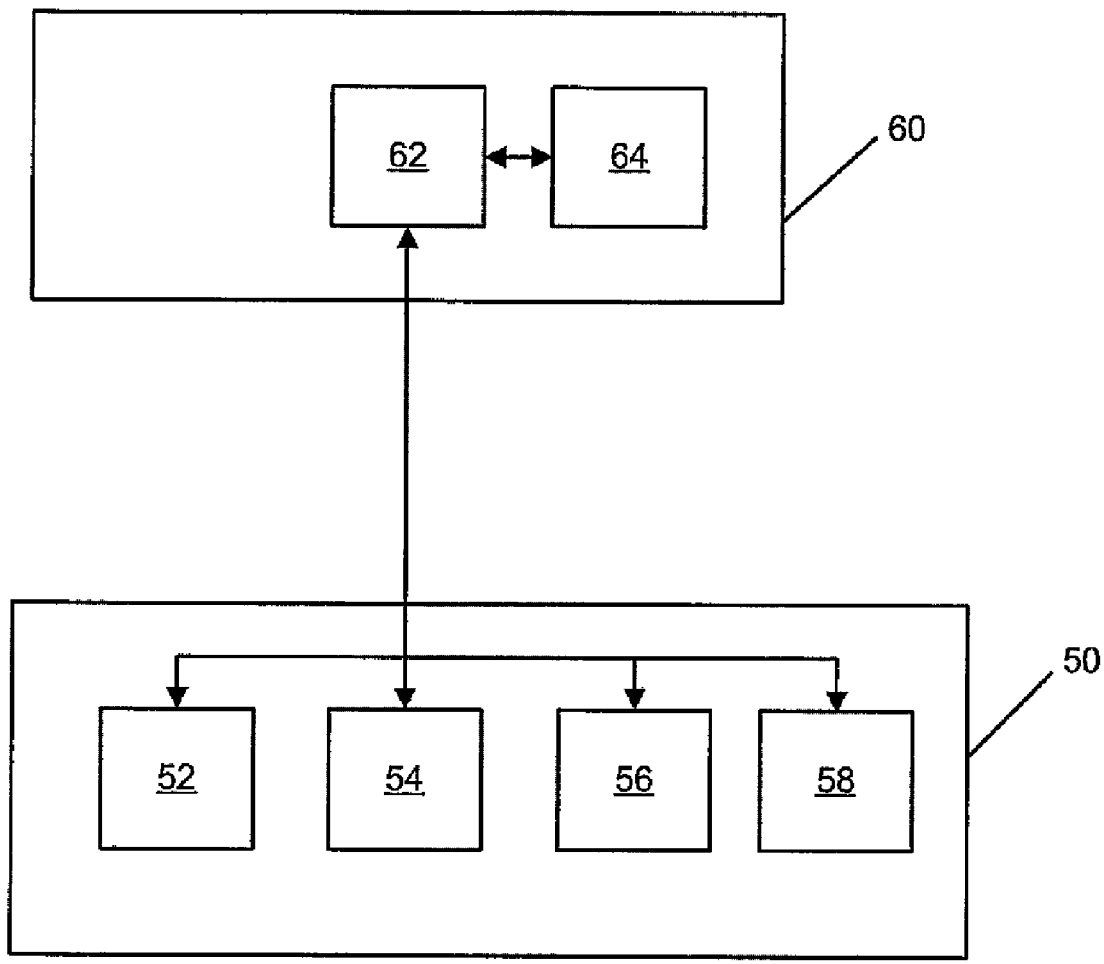
FIG. 1 is a schematic block diagram of core components of a gaming system in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF EMBODIMENTS

Figure 11:
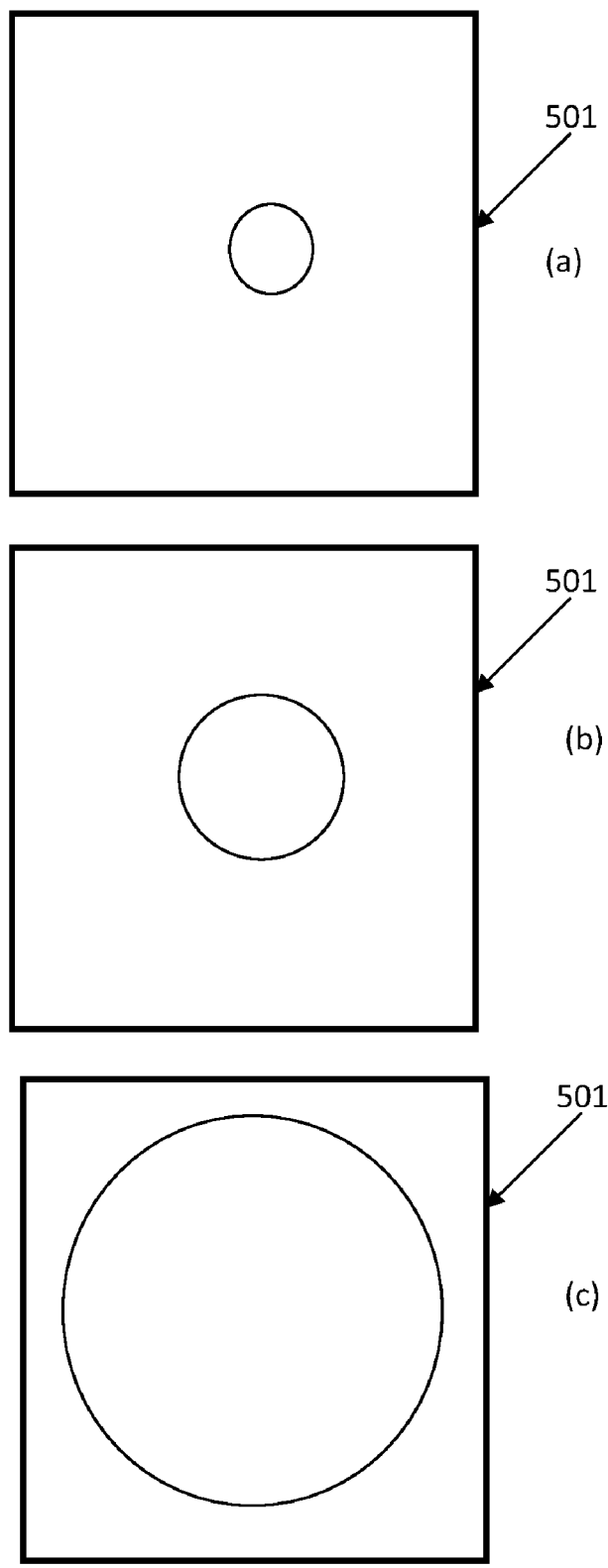

Referring to the drawings, there is shown a gaming system arranged to implement a game in which a plurality of symbols from a set of symbols is selected and displayed in symbol positions in one or both of rows and columns. In this embodiment, a gaming system is arranged to vary the appearance of one of the set of available symbols, to indicate a probability of winning a prize based on that symbol. Referring to FIG. 11, for example, the symbol shown here is a "globe" symbol 501. The gaming system is arranged to increase the size of the globe symbol 501 (compare FIG. 11a with FIG. 11c) to indicate to a player a greater probability of winning the prize based on occurrence of the globe symbol 501. This provides a good indication to the player of the probability of winning a prize based on, for example, a combination of a plurality of the globe symbols being selected and displayed. In one embodiment, the probability of selection of the globe symbol may be increased by increasing the number of globe symbols available in the set of symbols. In another embodiment, the probability of selection of the globe symbol may be increased by weighting a symbol selector of the gaming system so that there is an increased likelihood of selecting the globe symbol.

This provides an entertaining graphical indication to the player of a probability of winning a prize. It also has the advantage of varying the probability of winning a prize. The probability in one embodiment varies with the amount of credit that a player inputs. The change in appearance of the symbol advantageously clearly indicates to the player the variation in probability of winning the prize.

The gaming system can take a number of different forms.

In a first form, a stand alone gaming machine is provided wherein all or most components implementing the game are present in a player operable gaming machine.

In a second form, a distributed architecture is provided wherein some of the components implementing the game are present in a player operable gaming machine and some of the components implementing the game are located remotely relative to the gaming machine. For example, a "thick client" architecture may be used wherein part of the game is executed on a player operable gaming machine and part of the game is executed remotely, such as by a gaming server; or a "thin client" architecture may be used wherein most of the game is executed remotely such as by a gaming server and a player operable gaming machine is used only to display audible and/or visible gaming information to the player and receive gaming inputs from the player.

However, it will be understood that other arrangements are envisaged. For example, an architecture may be provided wherein a gaming machine is networked to a gaming server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Irrespective of the form, the gaming system includes several core components. At the broadest level, the core components are a player interface 50 and a game controller 60 as illustrated in FIG. 1. The player interface is arranged to enable manual interaction between a player and the gaming system and for this purpose includes the input/output components for the player to enter instructions and play the game.

Components of the player interface may vary from embodiment to embodiment but will typically include a credit mechanism 52 to enable a player to input credits and receive payouts, one or more displays 54, a game play mechanism 56 that enables a player to input game play instructions (e.g. to place bets), and one or more speakers 58.

The game controller 60 is in data communication with the player interface and typically includes a processor 62 that processes the game play instructions in accordance with game play rules and outputs game play outcomes to the display. Typically, the game play instructions are stored as program code in a memory 64 but can also be hardwired. Herein the term "processor" is used to refer generically to any device that can process game play instructions in accordance with game play rules and may include: a microprocessor, microcontroller, programmable logic device or other computational device, a general purpose computer (e.g. a PC) or a server.

Figure 2:
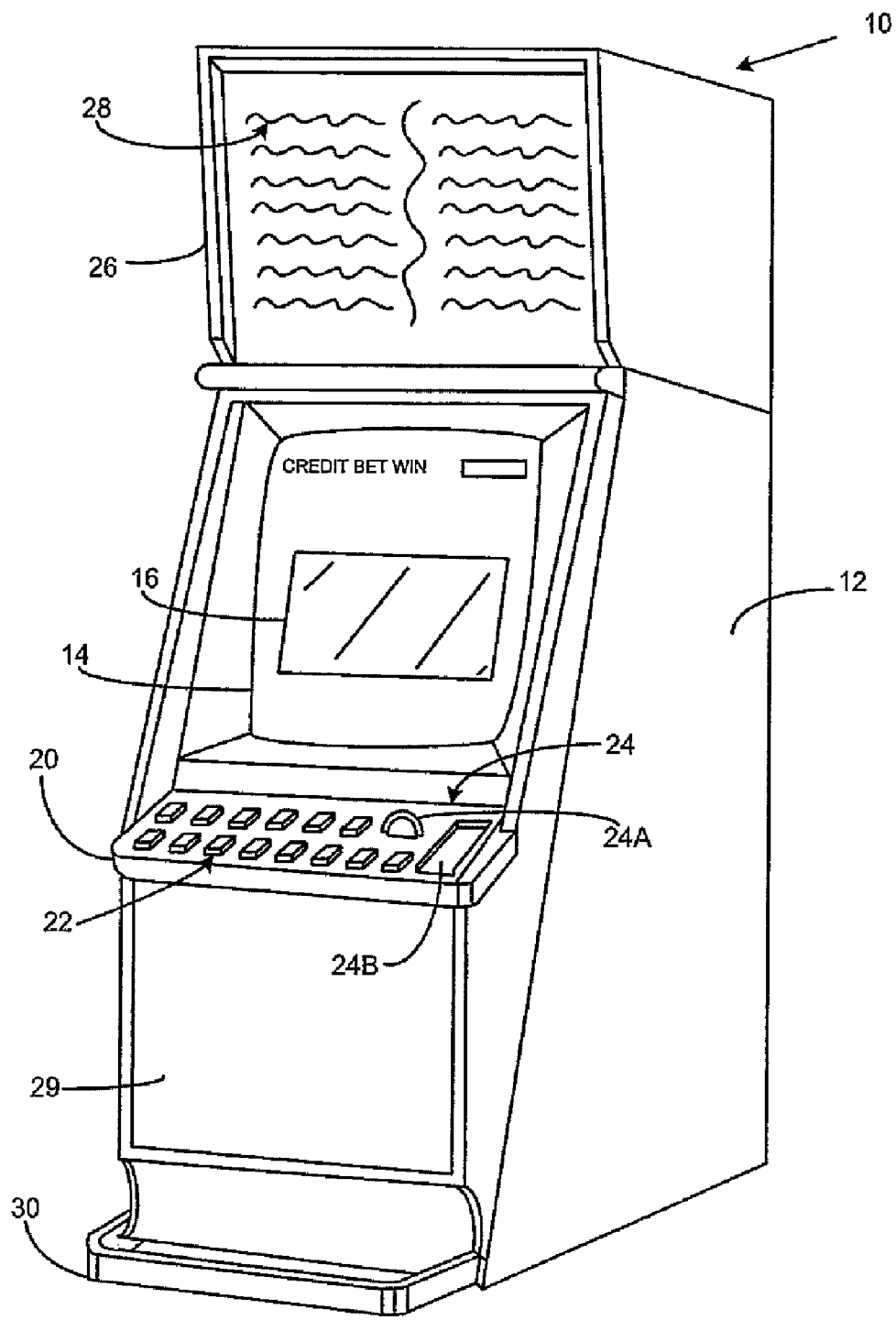
FIG. 2 is a diagrammatic representation of a gaming system in accordance with an embodiment of the present invention with the gaming system implemented in the form of a stand alone gaming machine.

A gaming system in the form of a stand alone gaming machine 10 is illustrated in FIG. 2. The gaming machine 10 includes a console 12 having a display 14 on which is displayed representations of a game 16 that can be played by a player. A mid-trim 20 of the gaming machine 10 houses a bank of buttons 22 for enabling a player to interact with the gaming machine, in particular during gameplay. The mid-trim 20 also houses a credit input mechanism 24 which in this example includes a coin input chute 24A and a bill collector 24B. Other credit input mechanisms may also be employed, for example, a card reader for reading a smart card, debit card or credit card. A reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

Figure 3:
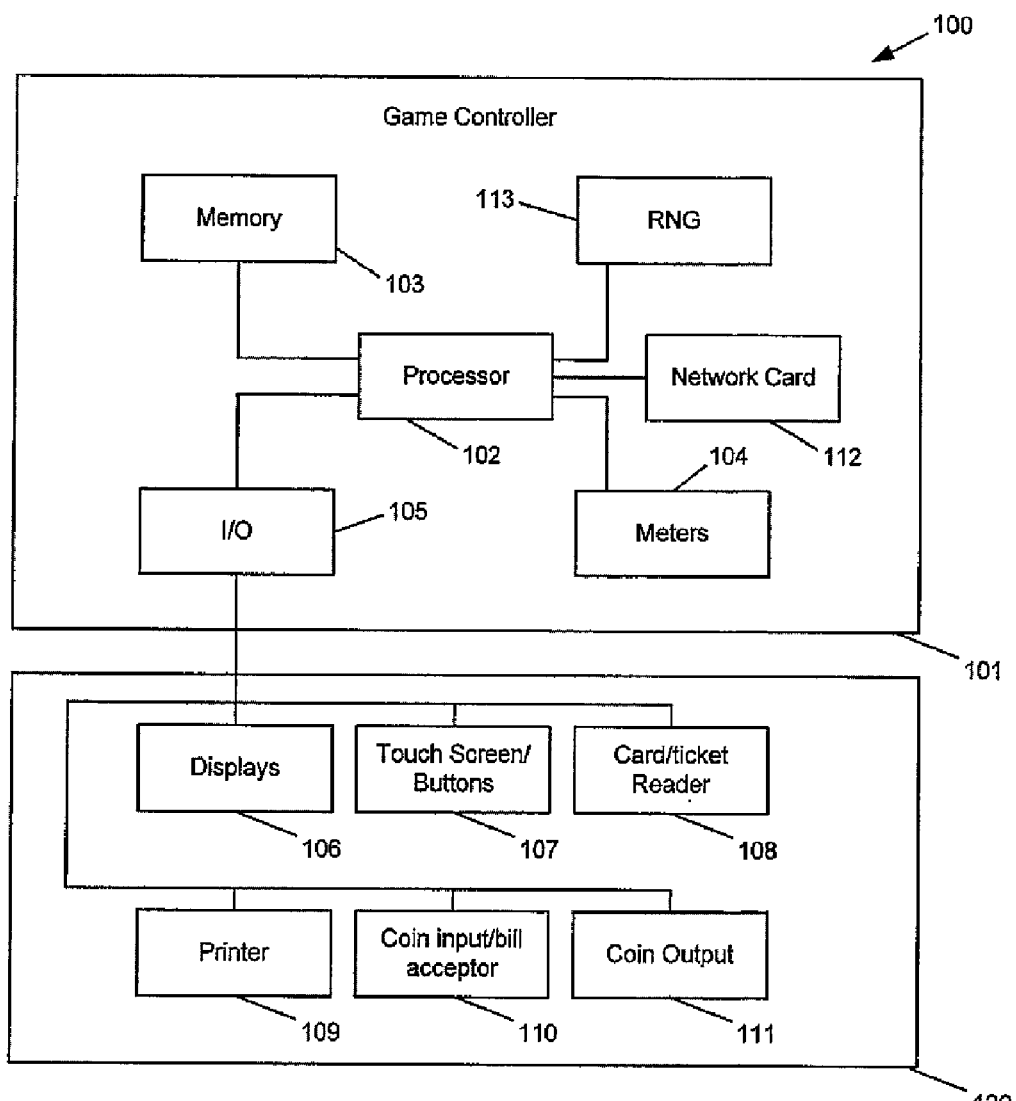
FIG. 3 is a schematic block diagram of operative components of the gaming machine shown in FIG. 2.

FIG. 3 shows a block diagram of operative components of a typical gaming machine which may be the same as or different to the gaming machine of FIG. 2.

The gaming machine 100 includes a game controller 101 having a processor 102. Instructions and data to control operation of the processor 102 are stored in a memory 103, which is in data communication with the processor 102. Typically, the gaming machine 100 will include both volatile and non-volatile memory and more than one of each type of memory, with such memories being collectively represented by the memory 103.

The gaming machine has hardware meters 104 for purposes including ensuring regulatory compliance and monitoring player credit, an input/output (I/O) interface 105 for communicating with peripheral devices of the gaming machine 100. The input/output interface 105 and/or the peripheral devices may be intelligent devices with their own memory for storing associated instructions and data for use with the input/output interface or the peripheral devices. A random number generator module 113 generates random numbers for use by the processor 102. Persons skilled in the art will appreciate that the reference to random numbers includes pseudo-random numbers.

In the example shown in FIG. 3, a player interface 120 includes peripheral devices that communicate with the game controller 101 include one or more displays 106, a touch screen and/or buttons 107 (which provide a game play mechanism), a card and/or ticket reader 108, a printer 109, a bill acceptor and/or coin input mechanism 110 and a coin output mechanism 111. Additional hardware may be included as part of the gaming machine 100, or hardware may be omitted based on the specific implementation.

In addition, the gaming machine 100 may include a communications interface, for example a network card 112. The network card may, for example, send status information, accounting information or other information to a central controller, server or database and receive data or commands from the central controller, server or database.

Figure 4:
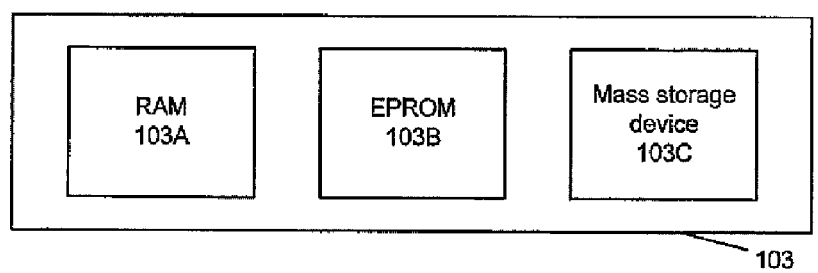
FIG. 4 is a schematic block diagram of components of a memory of the gaming machine shown in FIG. 2.

FIG. 4 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

It is also possible for the operative components of the gaming machine 100 to be distributed, for example input/output devices 106, 107, 108, 109, 110, 111 to be provided remotely from the game controller 101.

Figure 5:
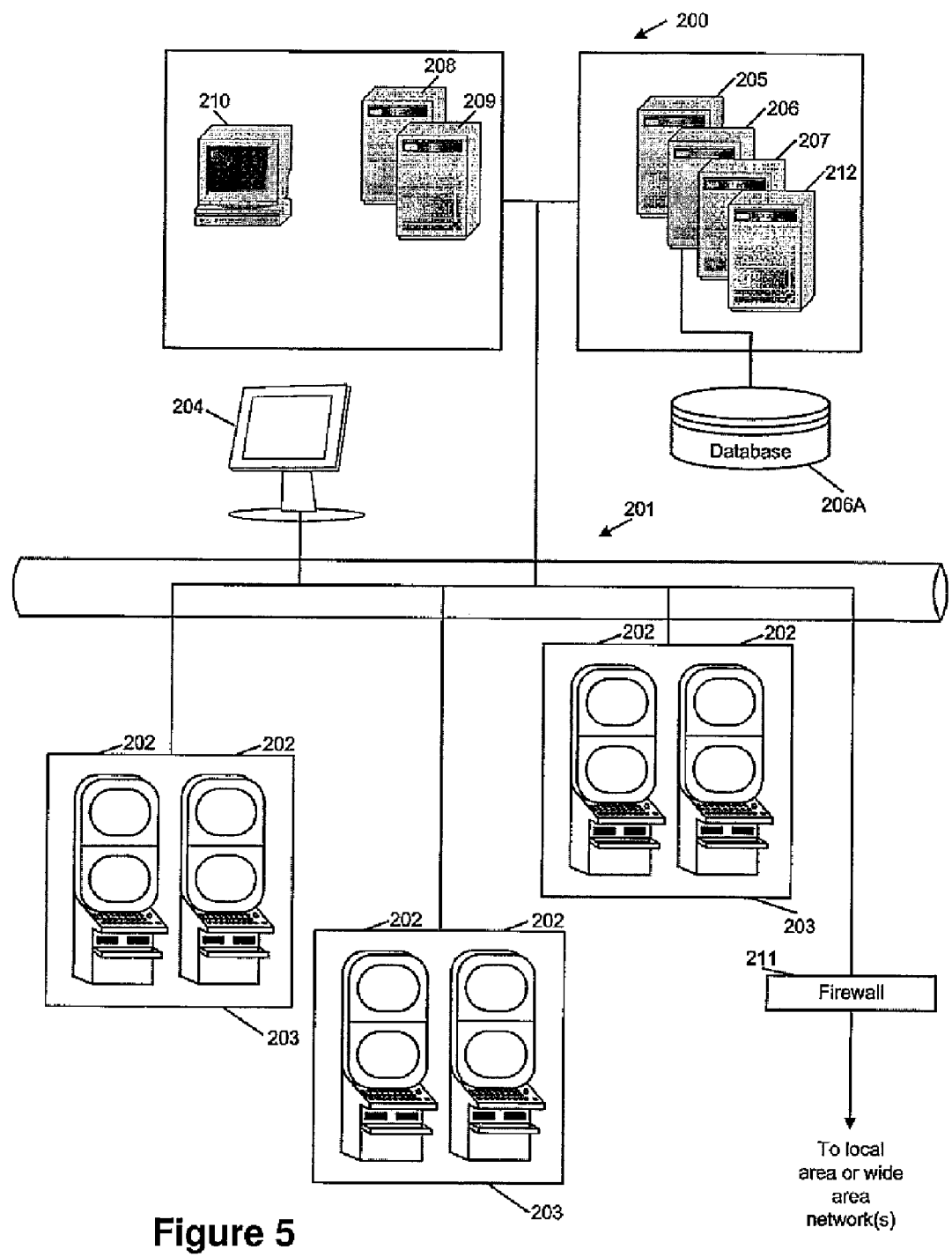
FIG. 5 is a schematic diagram of a gaming system in accordance with an alternative embodiment of the present invention with the gaming system implemented over a network.

FIG. 5 shows a gaming system 200 in accordance with an alternative embodiment. The gaming system 200 includes a network 201, which for example may be an Ethernet network. Gaming machines 202, shown arranged in three banks 203 of two gaming machines 202 in FIG. 5, are connected to the network 201. The gaming machines 202 provide a player operable interface and may be the same as the gaming machines 10, 100 shown in FIGS. 2 and 3, or may have simplified functionality depending on the rules, guidelines, and/or preferences for implementing game play. While banks 203 of two gaming machines are illustrated in FIG. 5, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, game server 205 implements part of the game played by a player using a gaming machine 202 and the gaming machine 202 implements part of the game. With this embodiment, as both the game server and the gaming device implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to perform accounting functions for the Jackpot game. A loyalty program server 212 may also be provided.

In a thin client embodiment, game server 205 implements most or all of the game played by a player using a gaming machine 202 and the gaming machine 202 essentially provides only the player interface. With this embodiment, the game server 205 provides the game controller. The gaming machine will receive player instructions, pass these to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming network 200, including for example a gaming floor management server 208, and a licensing server 209 to monitor the use of licenses relating to particular games. An administrator terminal 210 is provided to allow an administrator to run the network 201 and the devices connected to the network.

The gaming network 200 may communicate with other gaming systems, other local networks, for example a corporate network, and/or a wide area network such as the Internet, for example through a firewall 211.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random generator engine. Alternatively, a separate random number generator server could be provided. Further, persons skilled in the art will appreciate that a plurality of games servers could be provided to run different games or a single game server may run a plurality of different games based on the terminals.

Figure 6:
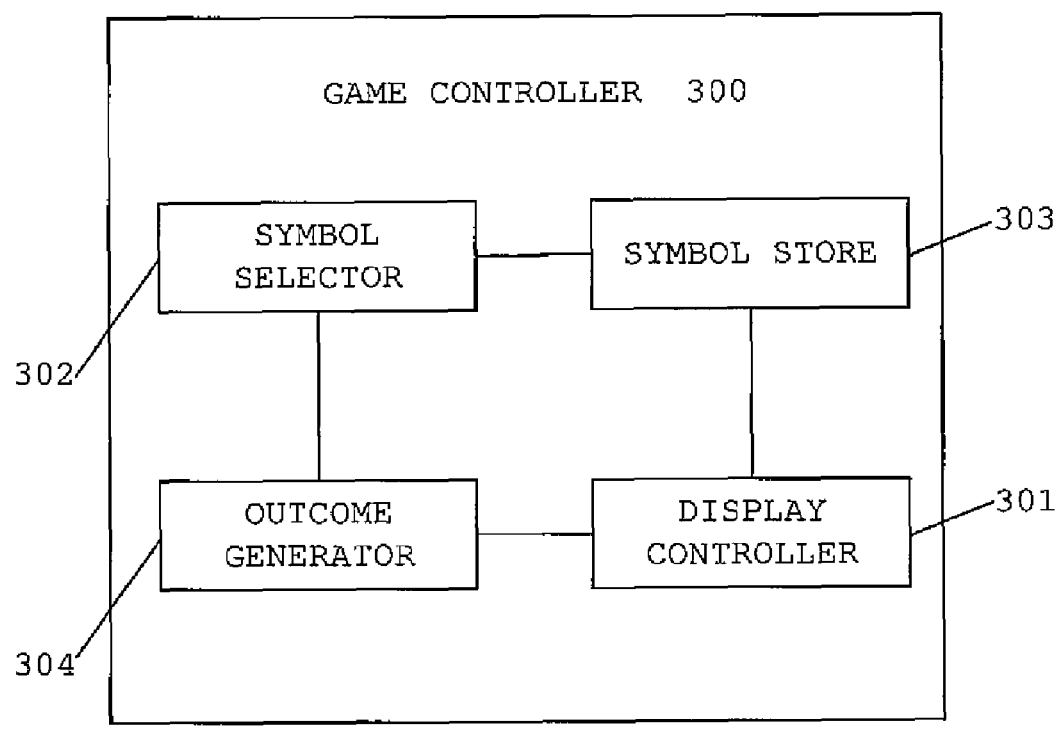
FIG. 6 is a schematic diagram of functional components of a gaming system in accordance with an embodiment of the present invention.

Referring to FIG. 6, the functionality of embodiments of the present invention may be implemented by a game controller having the functional components illustrated. In this embodiment, the functional components are implemented utilising a processor and memory (such as processor 102 and memory 103 in FIG. 3, or processor 62 and memory 64 in FIG. 1, for the game server 205 in FIG. 5), and associated programming. Other implementations are envisaged. For example the functional blocks of FIG. 6 may be implemented in hardware as separate units, or a combination of hardware and software as separate units. Any practical implementation of these functional units may be employed.

In this embodiment, the game controller 300 is arranged to control the gaming system to play a game which includes selection of a plurality of symbols from a set of symbols. The game is implemented as a "reel" game. The game controller 300 includes a display controller 301 which is arranged to control the display (reference numerals 54, 14, 106, 204 of previous figures) to emulate a representation of reels bearing symbols. Alternatively, the display may include a stepper motor and physical reels bearing the symbols.

The game controller 300 includes a symbol selector 302 which is arranged to select a plurality of symbols from a set of symbols available in a symbol store 303. An outcome generator 304 is arranged to determine an outcome of the game. In this embodiment, the outcome of the game depends on the selected symbols and may include a win outcome, loss outcome, trigger outcome, a feature outcome or other outcome. Outcomes may be determined on the basis of symbols appearing in one or more horizontal lines, diagonal lines, or any other pre-determined combinations.

Figure 7:
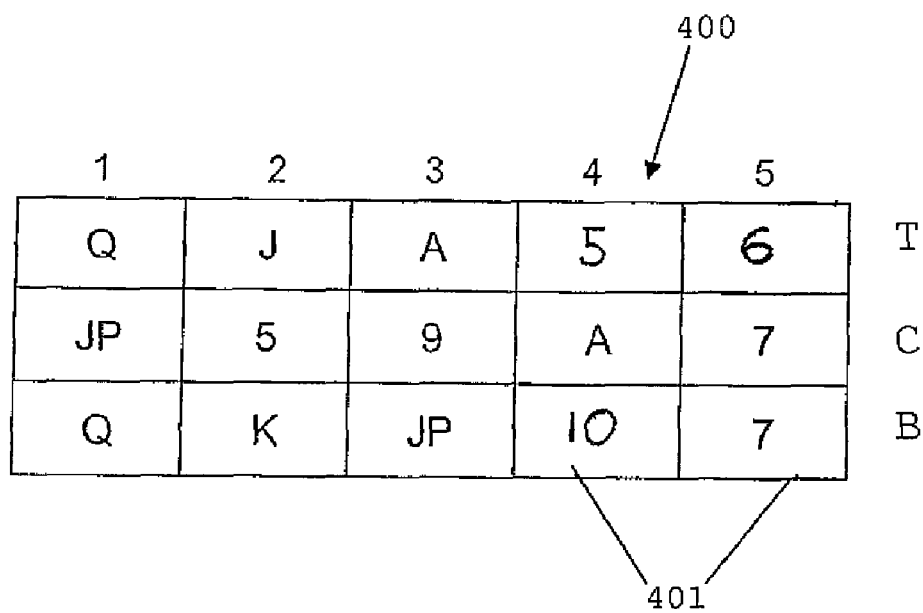
FIGS. 7 and 8 are schematic representations of example displays generated by a gaming system in accordance with an embodiment of the present invention.

FIG. 7 shows a representation of a gaming machine display 400 which, in the example shown, has five reels (numbered "1" to "5"). The display 400 shows three reel positions high when the reels have stopped/the symbols have been selected. The reel positions are designated Bottom ("B"), Centre ("C") and Top ("T"). This is a typical reel-type display for a gaming machine. It will be appreciated that in other embodiments the number of reel positions may be more or less than in display 400. Also the number of reels may be more or less than in the display 400.

The reels may be virtual reels, generated as a video display from the selected symbols, actual mechanical reels carrying the symbols and driven by a stepper motor, or any other reel arrangement or emulation. In the case of actual physical reels, the game controller drives a stepper motor to randomly select the symbols appearing in the display 400.

The game outcome is determined by the outcome generator 304 based on combinations of symbols selected and appearing in the display 400. The symbols may be any symbols. As will be appreciated, many different types of symbols are used in gaming systems. A set of symbols may include standard symbols and function symbols. For example, standard symbols may resemble fruit such as apples, pears and bananas with a win outcome being determined when a predetermined number of the same fruit appear on a display in the same line, scattered, and so on. The function associated with a function symbol may be a "wild" function wherein display of the function symbol is treated during consideration of the game outcome as any of the standard symbols. Other functions may include scatter functions, multiplier functions, repeat win functions, jackpot functions and feature commencement functions.

In the example shown in FIG. 7, the symbols are representations of cards, by which a poker-type card game may be played. In this example, a winning poker hand appearing on the C line may cause the outcome generator to determine that a Win has occurred and that an appropriate prize may be awarded. For example, five of a kind (e.g. 5 jacks "J". 5 tens "10" etc) on the C line may result in a win. A straight or a straight flush or any other poker combination on the C line may also result in a win. "JP" are also shown representing jackpot symbols.

The diagram shown in FIG. 7 is one way of representing the symbols only. It will be appreciated that in other embodiments of the invention symbols may be represented in different ways, using any type of fancy artwork, or in any appropriate manner.

Operation of an embodiment of the present invention will now be described with reference to FIGS. 7 to 12.

Referring to FIG. 7, the symbol selector 302 selects a plurality of symbols from symbols available from the symbol store 303. The game controller 300 operates via the display controller 301 to emulate spinning of reels in the display 400. The selected symbols 401 are "spun up" on the reels. This is how a conventional video animated reel spin game operates. A game outcome is determined by the outcome generator 304 depending upon line or scatter combinations (or other features, such as bonus awards) of the symbols appearing in the display 400.

The gaming system of this embodiment may also be arranged to play for a jackpot prize. As discussed above, one problem with jackpot-type prizes is that the winning of a jackpot is generally independent of the number of credits wagered by a player. Players who are willing to bet more credits to win a jackpot e.g. more credits per line, have only as much chance as a player who is willing to bet only a small number of credits per line. This is perceived as being unfair to players who are willing to gamble higher (in order to win the jackpot) than other players.

In this embodiment of the present invention, a player's chances of winning a jackpot are varied in accordance with the amount of credit bet by the player. Further, in order to clearly indicate to a player that the probability has been varied, a symbol on which a jackpot prize is based has its appearance varied. The player viewing the symbol is therefore aware of the change probability of winning the prize. Examples of how the appearance of a symbol may be varied are illustrated in FIGS. 9, 10 and 11.

Figure 9:
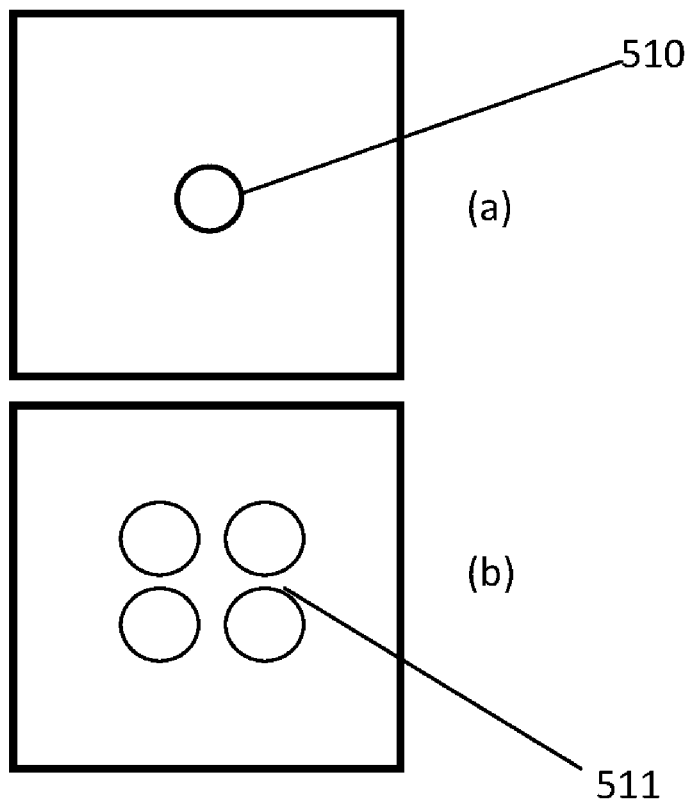
FIGS. 9 to 11 are example displays of symbols indicating a probability of winning a prize based on the symbols, generated by a gaming system in accordance with an embodiment of the present invention.
Figure 10:
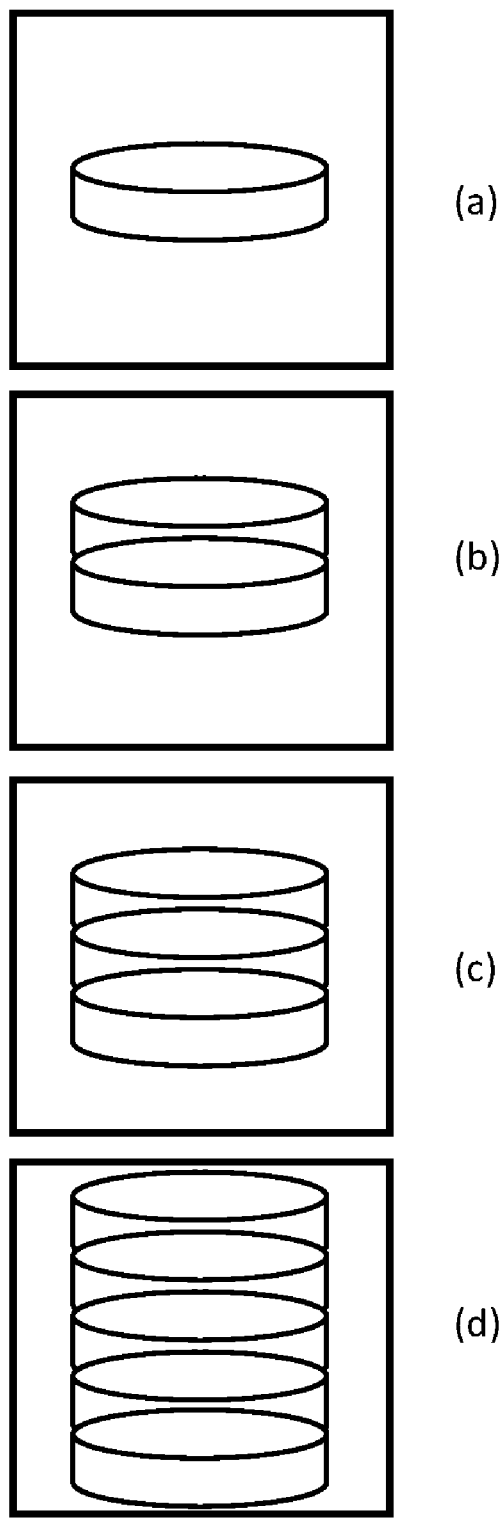

In FIG. 9, a jackpot symbol is represented by a disk 510 (FIG. 9*a*). On the gaming controller determining that is to implement an increased probability of winning the jackpot (because, for example, the player has bet an increased amount of credit) then it controls the display controller 301 to increase the number of disks in the symbol. In FIG. 9*b*, the symbol includes four disks 511. The variation in the number of disks 511 in this embodiment is proportional to the increased probability. Note that in other embodiments, the variation in the appearance of the symbol, although indicating a variation in probability, may not be proportional to the variation in probability. In this case, the player has bet four credit units per line (as opposed to the minimum bet of one credit unit per line), resulting in a fourfold increase in the probability of winning the jackpot based on a predetermined combination of the jackpot symbols (being the disks in FIG. 9). Showing four disks 511 in FIG. 9*b* therefore indicates to the player that his chances of winning the jackpot have been increased fourfold.

Any jackpot symbol that is displayed by the display following the selection of the symbols will be displayed as the changed appearance symbol, including four disks.

In this embodiment, the appearance of the symbol may be changed before the symbol selection is made for play of the game. Any jackpot symbol appearing on the display from the preceding game, therefore, is changed to the changed appearance symbol before a selection is made and the reels are spun for the present game. The appearance change may follow the player betting his credit. This indicates to the player that the credit has been received and the subsequent game play will be on the basis of the varied probability.

The invention is not limited to changing the appearance of displayed symbols before game play, however, and, in alternative embodiments, the appearance of the symbol may not be changed until after symbol selection has been made and the reels have been spun for the present game.

Another example of how the appearance of a symbol may be altered is given in FIG. 10. In this example, the jackpot symbol is a stack of coins. The display controller 301 changes the display of the stack of coins to increase the height of the stack to represent increased probability of winning the jackpot based on the symbol. FIG. 10*a* shows the lowest probability. Stack size increases through FIGS. 10*b*, 10*c* to 10*d* represent an increase in probability of winning the jackpot based on the stack of coins symbol.

Another example of symbol appearance variation is illustrated by the globe symbol 501 in FIG. 11. In this example, the size of the symbol becomes greater as the probability of winning a jackpot based on the symbol increases. FIG. 11*a* represents the lowest probability and FIG. 11*c* the highest probability.

Variations in the appearance symbols are not limited to the variations illustrated by the examples of FIGS. 9 to 11. Any variation in the appearance of any symbol to indicate a change in probability falls within the scope of the present invention. In another alternative, a symbol may be replaced with a totally different symbol to indicate the change in probability. In another example, a symbol may be associated with a numeral (e.g. the numeral may appear next to the symbol), and the value of the numeral may indicate the magnitude of the variation in probability. Many other variations in the appearance of the symbol will be apparent to a game designer.

Figure 8:
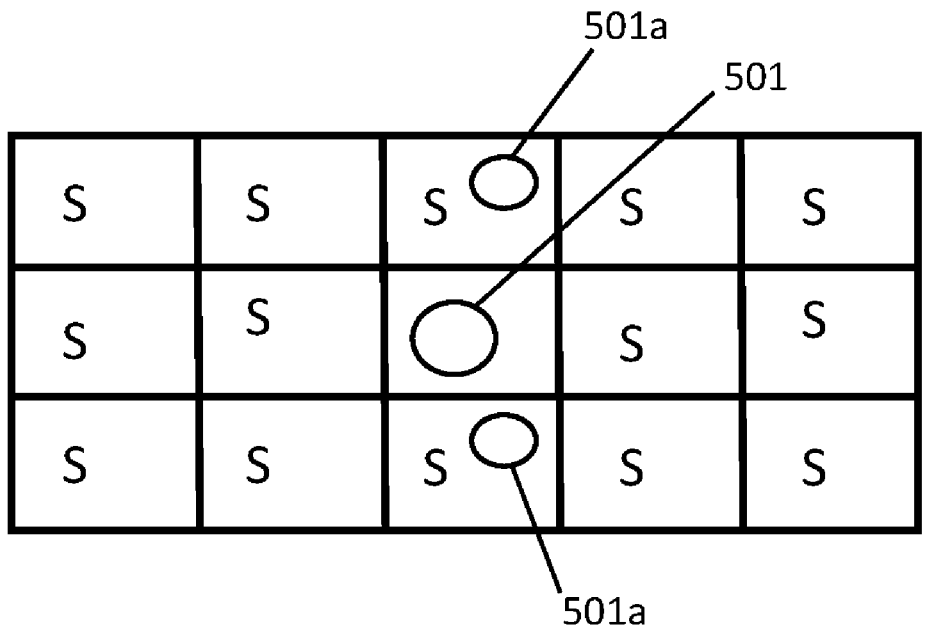

The probability of winning a prize such as a jackpot based on a symbol or symbols available in the game may be varied in a number of ways. In one embodiment, as illustrated in FIG. 8, a number of jackpot symbols available in the set of symbols is increased in accordance with the amount of credit bet by the player. Providing more symbols available in the set of symbols addresses the problems with the limited number of virtual reel stops that are available. The more jackpot symbols there are, the more chance that they will be selected. In one embodiment, this is done by putting the extra jackpot symbols on the virtual reel as "background" symbols adjacent to the symbols that are already available on those reel positions. Referring to FIG. 8, the jackpot symbol in this example is a large globe (such as in FIG. 11*d*) 501. As well as changing the appearance of the jackpot symbol, an increased size jackpot symbol 501*a* is produced at symbol positions either side of the jackpot symbol 501. Three varied appearance jackpot symbols are therefore available and in this case a player has bet three credits per line. Because of the change in appearance of the symbol, the player is aware that they have an increased probability of winning.

In an alternative embodiment, another way of varying the probability of winning a prize such as a jackpot based on a jackpot symbol, is by weighting the symbol selection process to increase the chances of the jackpot symbols being selected. In this case the symbol selector 302 is modified to increase the chance of a jackpot symbol being selected e.g. by weighting a random number generator which generates numbers for selecting the symbols so that the jackpot symbol is more likely to be selected.

Figure 12:
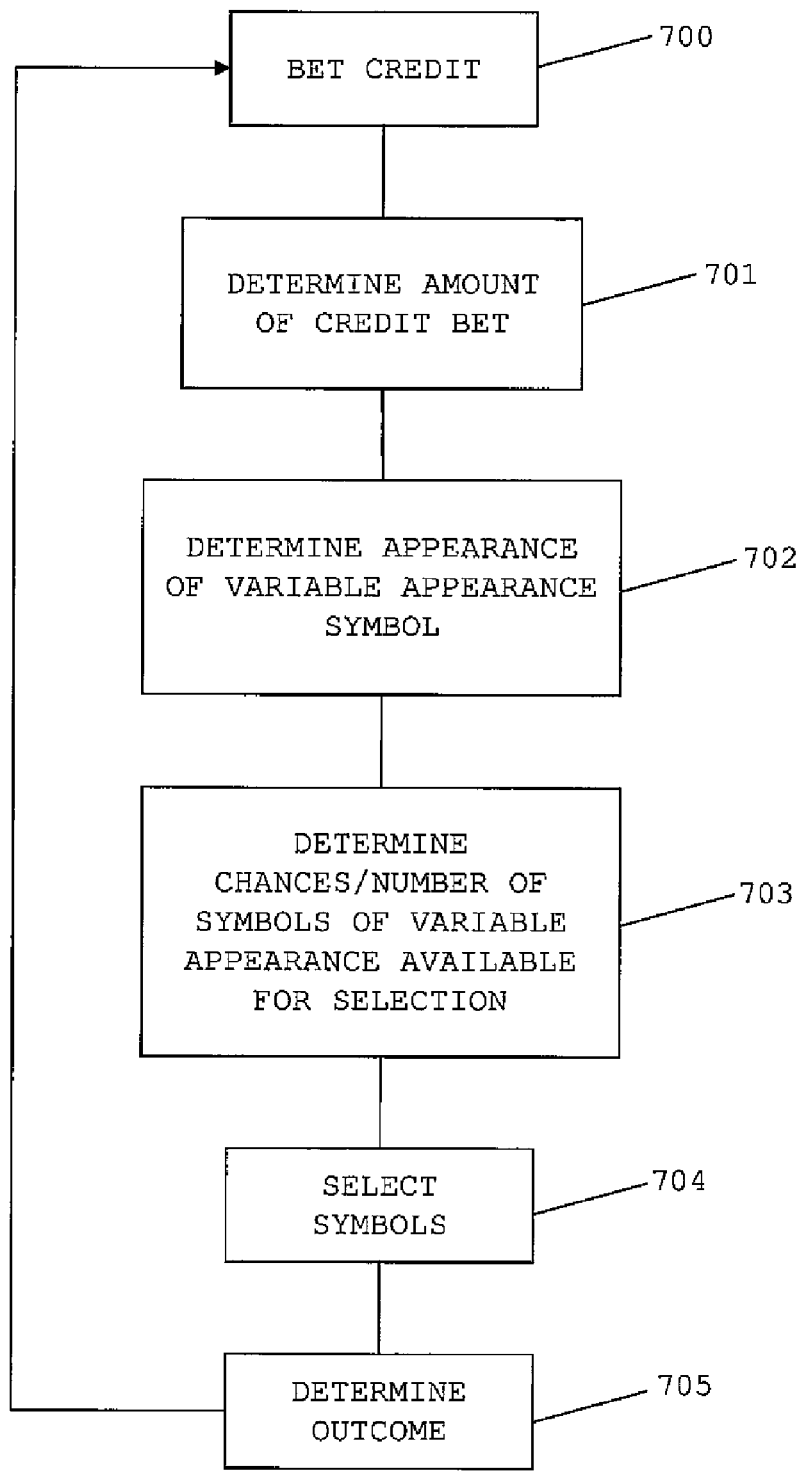
FIG. 12 is a flow diagram illustrating operation of a gaming system in accordance with an embodiment of the present invention.

A game playing process in accordance with an embodiment of the present invention will now be summarised with reference to FIG. 12. At 700 a player bets an amount of credit to play the gaming system. At 701 the game controller 300 determines the amount of credit bet and at 702 it determines how the appearance of a variable appearance symbol should be changed, and the display controller 301 is arranged to set the appearance of the variable appearance symbol. At 703 the game controller 300 determines the probability of selection of the variable appearance symbol based on the amount of credit and either changes the number of symbols available in the set of symbols for selection or weights the symbol selector 302 to vary the chances of selection of the symbol of variable appearance.

At 704 the game is played by a selection of symbols from the symbol store 303 by the symbol selector 302. The selection of symbols will be influenced by the varied probability of selection of the variable appearance symbol.

At 705 a game outcome is determined and any prize is paid to the player.

As discussed above, the appearance of the symbol may be changed before the symbol selection is made for play of the current game, or, alternatively, it may be changed during or after the reels have been spun for the current game. In some embodiments, this will depend upon how the game is triggered to commence.

In some gaming systems, a player may first place a bet per line and then determine how many lines will be played. When the selection of the number of lines to be played has been made, the game then automatically commences i.e. the reels start spinning and the selection of the position on which to stop is made. In other types of gaming systems, the bet selection sequence is reversed (i.e. the number of lines to be played is selected and then the player determines a bet per line). In yet other types of gaming systems, the player places the bet and the game does not commence until a player interface (e.g. a start button) is actuated.

In the type of systems where the game commences automatically, then, generally, the reels are already spinning before the appearance of a symbol (a Jackpot symbol, for example) can be changed. In such systems, an embodiment of the present invention may be implemented by changing the appearance of the symbol after the reels have stopped. In a variation, the appearance of the symbol may be changed as the reels spin. In some embodiments, images are designed so that they have a recognisable appearance during spin of the reel.

In gaming systems where a player actuates an interface to commence the game e.g. by actuating a start button, then the image may be changed before the reels start spinning.

Note that the invention is not limited to application in gaming systems where players bet per line or bet on a number of lines, but may be implemented in any type of gaming system. The system is also not limited to spinning reel systems, but may be played in any gaming system where a plurality of symbols are selected from a set of symbols.

In the above embodiments, the probability of selection of symbols may be varied by increasing the total number of symbols on the reel, or varying the probability of selection of the symbol. The following examples explain how variation of the number of symbols on the reel may be achieved.

In the following examples of variations of embodiments of the present invention, the Jackpot is won for five "globe" symbols appearing on a purchased line in a reel game. In these examples, the player purchases all lines and bets four credits per line. "Fairness" rules require that the chance of winning is four times more than when a player bets one credit per line.

EXAMPLE 1

The total number of globe symbols on a reel increase: When 1 credit is bet per line, the reel strip 1 has 20 positions and 1 position is a globe. When 4 credits are bet per line, the reel strip has 23 positions and 4 positions are globes. To make it visually obvious to the player that there are 4 globes on the reel, each globe image has now changed design as in FIG. 9.

EXAMPLE 2

The total number of globe symbols on more than 1 reel increases. When 1 credit is bet per line, reel strips 1 and 2 each has 20 positions and 1 position on each strip is a globe. When 4 credits are bet per line, reel strips 1 and 2 each has 21 positions and 2 positions on each strip is a globe. To make it visually obvious to the player that there are 4 globes on the reels, each globe image has now changed design as in FIG. 9.

EXAMPLE 3

The total number of globe symbols increase without changing the reel strip lengths. When 1 credit is bet per line, the reel strip 1 has 20 positions and 1 position is a globe. When 4 credits are bet per line, the reel strip has 20 positions and 1 position is a globe and 3 other positions are now overlaid, or shown with a background symbol of a globe. To make it visually obvious to the player that there are 4 globes on the reel, each globe image has now changed design as in FIG. 9.

The probability may be varied in other ways, as discussed above. In other embodiments, for example, the number of reel strip positions may decrease to vary probability. For example, a reel strip when 1 credit is bet has 40 positions with one globe, but when 2 credits are bet, the reel strip is reduced to 20 positions with one globe symbol. Other ways of varying the probability may be implemented.

In the above embodiments, a probability of winning a jackpot prize is varied in accordance with variation in credit bet by a player. The invention is not limited to varying a jackpot outcome in accordance with credit bet. The probability of winning a prize may be varied on the basis of other factors, for example on the basis of a trigger condition determined by the gaming system. Triggers may include a measurement of time that the player has been playing the gaming system, a particular amount of weighting activity, it may be based on player tracking information, it may be a random event, or based on a particular combination or a particular symbol being spun up in the original symbol selection, or any other trigger. It may be based on a combination of these criteria.

In the above embodiment, it is the probability of selection of a symbol associated with a jackpot prize that is varied. The invention is not limited to varying the probability of winning jackpot prizes. The probability of any prize associated with the gaming system may be varied. For example, a probability of a set prize provided by a stand alone gaming machine based on a combination of symbols on that machine, may be varied by varying the probability of selection of those symbols.

In the above embodiment, only one of the symbols available is varied. The invention is not limited to this, and in other embodiments a plurality of available symbols may have their appearance varied.

In the above described embodiments, the display emulates a plurality of reels. In an alternative embodiment, the symbol selection may be implemented as actual reels driven by a stepper motor. Variation in appearance of the symbols may be implemented in a number of ways, for example by "back lighting" images existing on the reels that are not visible until illuminated. In another embodiment, the display may not emulate reels but merely show the selected symbols in a non-reel format e.g. presenting them as emulated playing cards, or other graphical representations in a series of rows and columns.

In the above embodiments, the gaming system may be implemented as a stand alone gaming machine (EGM) that effectively implements the game on its own, or it may include a terminal type device which interacts with another part of the system (e.g. a game server) to implement a game. It may include any appropriate architecture for implementing a gaming system in accordance with embodiments of the present invention.

It will be appreciated that embodiments of the present invention may be implemented utilising program code. The program code may be supplied in a number of ways. For example, by a computer readable medium, such as a disc or a memory, or as a data signal (by downloading it from a server, for example).

In the claims which follow and in the preceding description of the invention, except where the context indicates otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It will be appreciated by persons skilled in the art that numerous variations and/or modifications may be made to the invention as shown in the specific embodiments and/or aspects without departing from the spirit or scope of the invention as broadly described. The present embodiments and aspects are, therefore, to be considered in all respects as illustrative and not restrictive. Several embodiments are described above with reference to the drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any electronic device and/or machine-readable media suitable for accomplishing its operations. Certain embodiments of the present invention may be implemented using an existing computer processor and/or by a special purpose computer processor incorporated for this or another purpose or by a hardwired system, for example.

Embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

The invention claimed is:

1. A gaming system comprising:
a display arranged to display a representation of play of the game; and
a game controller arranged to:
select a plurality of symbols from a set of symbols for play of the game, the set of symbols including at least one special symbol;
control the display to display the plurality of selected symbols;
determine an amount of credit received at the gaming system to initiate play of the game;
vary a probability of the special symbol being selected by the game controller in response to receiving the amount of credit, wherein the probability is varied by adding a plurality of special symbols to the set of symbols in proportion to the amount of credit received;
control the appearance of the at least one special symbol so that the appearance of the at least one special symbol is indicative of the varied probability of winning a prize based on the at least one special symbol,
wherein the gaming system is arranged to control the appearance of the at least one special symbol to vary the appearance of the at least one of the symbols by varying the size of the symbol.

2. A gaming system in accordance with claim 1, wherein the game controller is arranged to vary the probability of winning the prize based on the at least one of the symbols.

3. A gaming system in accordance with claim 2, the game controller being arranged to vary the probability of the at least one of the symbols being selected.

4. A gaming system in accordance with claim 3, wherein the game controller is arranged to vary the probability of the at least one of the symbols being selected by increasing the number of the at least one of the symbols available for selection from the set of symbols.

5. A gaming system in accordance with claim 3, wherein the game controller is arranged to vary the probability of the at least one of the symbols being selected by weighting the selection of the at least one of the symbols from the set of symbols, so that there are more chances of the at least one of the symbols being selected.

6. A gaming system in accordance with claim 2, wherein the game controller is arranged to vary the probability of winning a prize based on the at least one of the symbols in dependence on the amount of credit bet on the game.

7. A gaming system in accordance with claim 6, wherein the at least one of the symbols is a jackpot symbol, and the probability of the at least one of the symbols being selected is varied in accordance with the amount of credit bet, whereby to vary the probability of winning a jackpot.

8. A gaming system in accordance with claim 1, wherein the game controller is arranged to control the appearance of the at least one of the symbols so that the appearance varies in proportion to a variation in probability of winning the prize.

9. A gaming system in accordance with claim 1, wherein the game controller is arranged to vary the appearance of the at least one of the symbols by varying a number of items in the at least one of the symbols.

10. A method of gaming, comprising:
selecting a plurality of symbols from a set of symbols for play of a game, the set of symbols including at least one special symbol;
controlling a display to display the plurality of selected symbols,
determining an amount of credit received at the gaming system to initiate play of the game;
varying a probability of the special symbol being selected by the game controller in response to receiving the amount of credit, wherein the probability is varied by adding a plurality of special symbols to the set of symbols in proportion to the amount of credit received; and controlling the appearance of the at least one special symbol so that the appearance of the at least one special symbol is indicative of the varied probability of winning a prize based on the at least one special symbol, wherein controlling the appearance of the at least one of the symbols comprises varying the size of the at least one of the symbols.

11. A method in accordance with claim 10, further comprising varying the probability of winning the prize based on the at least one of the symbols.

12. A method in accordance with claim 11, further comprising varying the probability of the at least one of the symbols being selected.

13. A method in accordance with claim 12, wherein varying the probability of the at least one of the symbols being selected comprises increasing the number of the at least one of the symbols available for selection from the set of symbols.

14. A method in accordance with claim 12, wherein varying the probability of the at least one of the symbols being selected comprises weighting the selection of the at least one of the symbols from the set of symbols, so that there are more chances of the at least one of the symbols being selected.

15. A method in accordance with claim 11, wherein the probability of winning the prize is varied in dependence upon credit bet on the game.

16. A method in accordance with claim 15, wherein the at least one of the symbols is a jackpot symbol.

17. A method in accordance with claim 10, wherein controlling the appearance of the at least one of the symbols comprises varying the appearance of the at least one of the symbols in proportion to a variation in the probability of winning the prize.

18. A method in accordance with claim 10, wherein controlling the appearance of the at least one of the symbols comprises varying a number of items in the symbol.

19. A tangible computer readable storage medium including a computer program comprising instructions for controlling a computer to implement a gaming system comprising:
a display arranged to display a representation of play of the game; and
a game controller arranged to:
select a plurality of symbols from a set of symbols for play of the game, the set of symbols including at least one special symbol;
control the display to display the plurality of selected symbols;
determine an amount of credit received at the gaming system to initiate play of the game;
vary a probability of the special symbol being selected by the game controller in response to receiving the amount of credit, wherein the probability is varied by adding a plurality of special symbols to the set of symbols in proportion to the amount of credit received;
control the appearance of the at least one special symbol so that the appearance of the at least one special symbol is indicative of the varied probability of winning a prize based on the at least one special symbol, wherein the game controller is arranged to control the appearance of the at least one special symbol to vary the appearance of the at least one of the symbols by varying the size of the symbol.

20. A game controller for a gaming system, the game controller arranged to control play of a game, and to control a display to display a representation of play of the game, the game controller arranged to:
select a plurality of symbols from a set of symbols for play of the game, the set of symbols including at least one special symbol;
control the display to display the plurality of selected symbols;
determine an amount of credit received at the gaming system to initiate play of the game;
vary a probability of the special symbol being selected by the game controller in response to receiving the amount of credit, wherein the probability is varied by adding a plurality of special symbols to the set of symbols in proportion to the amount of credit received;
control the appearance of the at least one special symbol so that the appearance of the at least one special symbol is indicative of the varied probability of winning a prize based on the at least one special symbol, wherein the game controller is arranged to control the appearance of the at least one special symbol to vary the appearance of the at least one of the symbols by varying the size of the symbol.

21. A game controller in accordance with claim 20, arranged to vary the probability of winning the prize based on the at least one of the symbols.

22. A game controller in accordance with claim 21, arranged to vary the probability of the at least one of the symbols being selected.

23. A game controller in accordance with claim 22, arranged to vary the probability of the at least one of the symbols being selected by increasing the number of the at least one of the symbols available for selection from the set of symbols.

24. A game controller in accordance with claim 22, arranged to vary the probability of the at least one of the symbols being selected by weighting the selection of the at least one of the symbols from the set of symbols, so that there are more chances of the at least one of the symbols being selected.

25. A game controller in accordance with claim 21, arranged to vary the probability of winning a prize based on the at least one of the symbols in dependence on the amount of credit bet on the game.

26. A game controller in accordance with claim 25, wherein the at least one of the symbols is a Jackpot symbol, and the probability of the at least one of the symbols being selected is varied in accordance with the amount of credit bet, whereby to vary the probability of winning a Jackpot.

27. A game controller in accordance with claim 20, arranged to control the appearance of the at least one of the symbols so that the appearance varies in proportion to a variation in probability of winning the prize.

28. A game controller in accordance with claim 20, arranged to vary the appearance of the at least one of the symbols by varying a number of items in the at least one of the symbols.

29. A tangible computer readable storage medium including a computer program, comprising instructions for controlling a computer to implement a game controller for a gaming system, the game controller arranged to control play of a game, and to control a display to display a representation of play of the game, the game controller arranged to:
select a plurality of symbols from a set of symbols for play of the game, the set of symbols including at least one special symbol;
control the display to display the plurality of selected symbols;
determine an amount of credit received at the gaming system to initiate play of the game;

vary a probability of the special symbol being selected by the game controller in response to receiving the amount of credit, wherein the probability is varied by adding a plurality of special symbols to the set of symbols in proportion to the amount of credit received;

control the appearance of the at least one special symbol so that the appearance of the at least one special symbol is indicative of the varied probability of winning a prize based on the at least one special symbol, wherein the game controller is arranged to control the appearance of the at least one special symbol to vary the appearance of the at least one of the symbols by varying the size of the symbol.

* * * * *